US005535466A

United States Patent [19]

Snell

[11] Patent Number: 5,535,466

[45] Date of Patent: Jul. 16, 1996

[54] SURGICAL TABLES

[76] Inventor: Thomas B. Snell, Gable Cottages, Charlton Horethorne, Sherbourne, Dorset, DT9 4NS, United Kingdom

[21] Appl. No.: 125,731

[22] Filed: Sep. 24, 1993

[30] Foreign Application Priority Data

Sep. 24, 1992 [GB] United Kingdom .................... 9220159
Sep. 27, 1992 [GB] United Kingdom .................... 9224945

[51] Int. Cl.[6] ............................ A01K 15/04; A61G 13/00

[52] U.S. Cl. ........................ 5/621; 5/611; 5/181; 5/507.1; 119/753

[58] Field of Search ................................ 5/600, 611, 621, 5/622, 623, 624, 181, 185, 503.1, 658, 507.1; 119/722, 753, 755

[56] References Cited

U.S. PATENT DOCUMENTS

| | | | |
|---|---|---|---|
| 2,945,731 | 7/1960 | Tutrone | 5/621 X |
| 3,174,722 | 3/1965 | Alm | 5/611 X |
| 3,373,453 | 3/1968 | Goodman | 5/611 |
| 3,523,312 | 8/1970 | Rogers | 5/503.1 |
| 3,771,782 | 11/1973 | Anderegg | 119/753 X |
| 4,045,011 | 8/1977 | Ford . | |
| 4,236,265 | 12/1980 | Carradine | 5/658 X |
| 4,552,346 | 11/1985 | Shnelle et al. . | |
| 4,566,198 | 12/1985 | Tominaga | 5/611 X |
| 4,732,088 | 3/1988 | Koechlin et al. . | |
| 5,287,575 | 2/1994 | Allen et al. | 5/623 |

FOREIGN PATENT DOCUMENTS

| | | | |
|---|---|---|---|
| 0026167 | 4/1981 | European Pat. Off. | 119/753 |
| 814770 | 6/1959 | United Kingdom . | |
| 857042 | 12/1960 | United Kingdom . | |
| 1566795 | 5/1980 | United Kingdom . | |
| 2133678 | 8/1984 | United Kingdom . | |

OTHER PUBLICATIONS

"Shanks Dorsal/Lateral Equine Surgery Table", By Shanks Veterinary Equipment, Inc., two pages.

*Primary Examiner*—Michael F. Trettel
*Attorney, Agent, or Firm*—Young & Thompson

[57] ABSTRACT

A surgical table for animals has a basic flat top which can serve for the smaller species. To accommodate large animals, extensions are fitted in the form of rigid panels having tongue and groove engagement with selected edge parts of the basic top. They can be clamped in position. The top is carried by folding legs enabling it to be lowered virtually to floor level and raised to operating height. The legs are in variable X-form with a scissor action, the top of one leg being hinged to the underside of the top and the top of the other leg having a sliding or rolling engagement. The adjustment is by hydraulic actuators, the main one, which aligns with the legs when fully folded, being assisted by a starter actuator which acts vertically between the legs and the table top at the beginning of each lift.

18 Claims, 4 Drawing Sheets

SURGICAL TABLES

FIELD OF THE INVENTION

This invention relates to surgical tables, and is particularly concerned with those for veterinary work.

BACKGROUND OF THE INVENTION

Animals come in all shapes and sizes, and equipment suitable for one species is not necessarily appropriate for another. For surgical work, small animals can be lifted on to an operating table, but large animals, such as horses and cattle, cannot easily be manoeuvred, and they present a big problem. When anaesthetized, they collapse, and although they may be rolled over to a more convenient position, it is never ideal for a vet to operate kneeling down.

There have been proposals for an operating table onto which an inert large animal can be manoeuvred when the table is lowered. It is then raised to a convenient height at which the vet can work. Among these is an inflatable structure such as described in U.S. Pat. No. 4,567,855.

While that inflatable structure has proved successful, there is still a need for a more compact, rigid but expansible structure, perhaps combined with a shallow inflatable top which can be contoured or adjusted to suit the animal and the attitude at which it is required to lie.

There are also available from Shanks Veterinary Equipment, Inc. of Milledgeville, Ill., various adjustable equine surgery tables with hydraulic operation of a rigid table top. However, these are incapable of being lowered very close to the ground (a minimum of 15 inches is quoted) and their complexity makes them expensive and difficult to keep hygienic.

It is the aim of this invention to provide an operating table which is safe, simple and easy to adjust and to keep clean, which can lower virtually to floor level, and which is readily adaptable to many different animals in various different postures.

SUMMARY OF THE INVENTION

According to one aspect of this invention there is provided a surgical table with a top and extensions for the top adapted to be fitted to at least some edges there of, each such edge and extension having mutual engagement means enabling variable positioning of the extensions and thus contour of the table.

Each engagement means is conveniently provided by a tongue and groove. The table top preferably has a laterally projecting tongue, the extensions each being provided with a matching groove. A screw device operable from below the table top and threaded through a lower limb of a member defining the groove may be is provided to clamp the extension to the top.

However, clamping may not be necessary if the tongue and groove are formed with a mutual hooked interengagement which prevents horizontal engagement or disengagement at right angles to the edge.

In any event, however fitted, each extension should preferably be flush with the table top.

There may also be provided restraint or support appliances adapted to be fitted to said edges of the top in the same manner as said extensions. One such appliance is a simple upright column. With two such columns, fittable to opposite sides of the table, they can be bridged by a support element secured to them. Such supports are primarily for tying an animal's legs to in the dorsal recumbent position.

Another appliance is an anchorage member to which can be attached to mattress or cushioning which may overlie the top.

According to another aspect of the present invention there is provided a surgical table having a top and two mutually pivoted legs capable of varying between a lowered, flattened position and a raised X-form, the upper end of a first leg being hinged to the underside of the top, the upper end of a second leg having a sliding or rolling engagement with said underside, towards and away from the hinge of said one leg, and actuator means arranged to act between said legs and the table top to cause the legs to convert between the flattened position and the X-form.

Preferably, the actuator means comprises a main actuator and a starter actuator, the starter actuator being substantially vertical to initiate and sustain the lift over a short travel from the flattened position, the main actuator being effective over the remainder of the lift.

Conveniently, the actuators will be hydraulic. It may be safer and more convenient to have two rams side by side and acting in parallel as the main actuator rather than one large cylinder which could restrict the ability of the structure to flatten.

In one preferred form, the main actuator acts on the legs in the region of their mutual pivot, and in the lowered position it will nest within the upper part of the second leg. However, in another form, particularly for smaller tables, the main actuator could be secured to the underside of the table top to act horizontally on the upper end of said second leg. Also, a substantial part of one leg may nest within the other leg in the flattened position to make the folded table very compact and low to the ground.

For stability, the lower ends of the legs will preferably have lateral extensions, and at least one leg will have roller means on such an extension, so that it moves easily over the floor when the table is raised and lowered.

There may also be a low trolley with means for locating the lower ends of one of the legs and for allowing limited travel of the lower end of the other of the legs, corresponding to the movement between the lowered, flattened positions and the raised X-form.

Generally there will be an inflatable mattress or cushioning to overlie the top, and extensions when provided, compartmented to provide adjustable cradling of an animal.

BRIEF DESCRIPTION OF THE DRAWINGS

For a better understanding of the invention, some embodiments will now be described, by way of example, with reference to the accompanying drawings, in which.

DETAILED DESCRIPTION OF THE INVENTION

Figure 1:
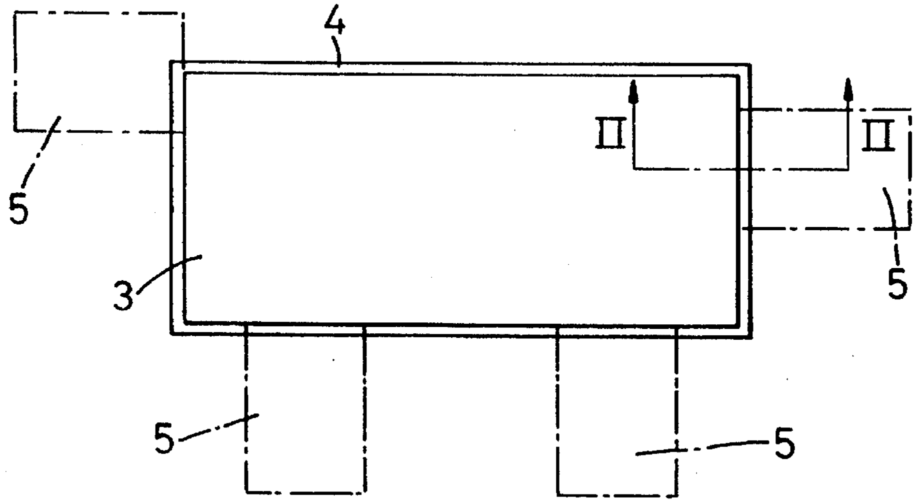
FIG. 1 is a plan view of a surgical table.
Figure 2:
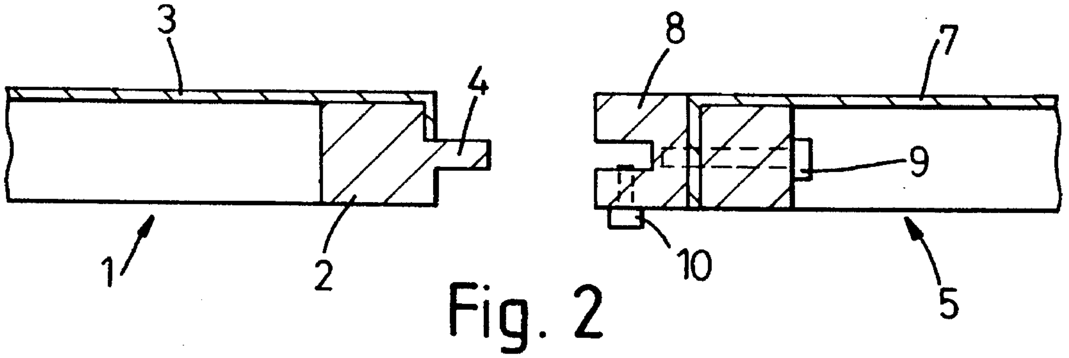
FIG. 2 is a cross-section, to an enlarged scale, on the line II—II of FIG. 1.

The simplest form of table, as in FIGS. 1 and 2, has a rectangular top 1. It is formed by a steel frame constructed from box section members 2 covered by a stainless steel sheet 3. Projecting horizontally from the outer members of the frame and extending around the complete periphery of the top 1 is a tongue 4, and the edge portion of the sheet 3 is folded down to meet the upper face of this tongue at its root.

This table top 1 will be sufficient in itself to take small animals, but it is not big enough to support larger ones such as horses or cattle in lateral recumbency. To accommodate them, extensions 5 may be fitted, using the tongue 4. These extensions 5 are smaller versions of the table top, each being rectangular, with a frame 6 covered by a stainless steel sheet 7. But along one of the shorter sides there is secured a clevis 8, its groove being open away from the rest of the extension 5, and its upper side being flush with the top of the sheet 7. The edge portion of the sheet is folded down and sandwiched between the clevis 8 and the adjacent member of the frame 6, all being secured by bolts 9 as indicated in outline. In this example the lower limb of the clevis 8 has a clamping screw 10 threaded up through it, but other ways of locating the extension may be adopted. For example, there could be a hook-on arrangement, or the tongue and groove might be dove-tailed so that the extension is slid on from one end. The weight of the extension would make it difficult to shift, especially when carrying part of an animal, and clamping would not be necessary.

Each extension may be provided along at least one side, usually the one opposite the clevis 8, with a tongue corresponding to the tongue 4. This enables it to support a further extension or devices such as described below in connection with FIG. 3.

The extension 5 shown in FIG. 2 can be fitted at any position around the periphery of the table top 1, simply by offering up the clevis 8 to the tongue 4 and, when fully mated, tightening up the screw 10 to clamp the two together. Typical extension positions are shown in outline in FIG. 1 where there are two for an animal's legs on one of the longer sides of the top 1. At one end, an extension 5 is fully engaged with the tongue 4, which may be appropriate for supporting the head of some animals, but at the other end an extension 5 is only partly engaged with the tongue, being set proud of the long side not carrying the leg extensions. This may be necessary for the largest animals. Such a facility for extending the table means that the top 1 can be fairly narrow and is allows the vet close access to all parts of the animal resting on it.

Figure 3:
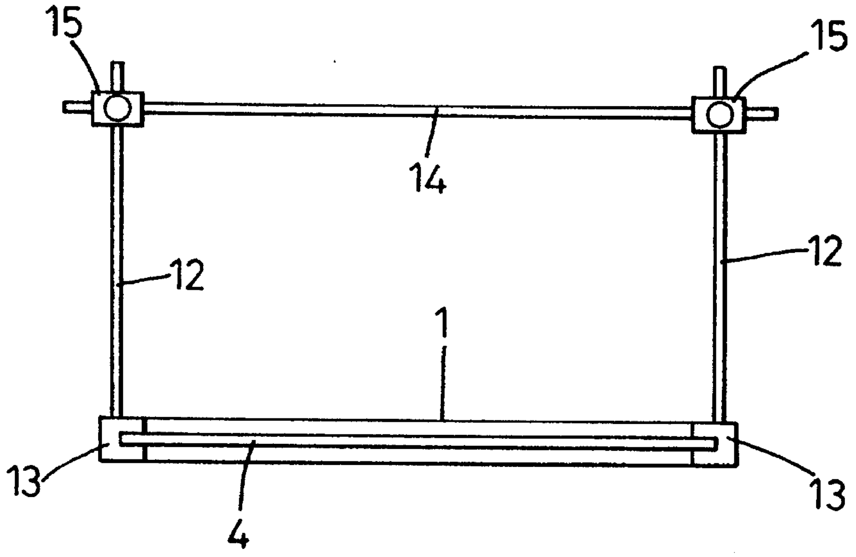
FIG. 3 is an end view of the table top with a support appliance fitted.

The tongues 4 can be used for other appliances, in this case a bridge 11 as shown in FIG. 3 for supporting an animal's legs, when it is in dorsal recumbency. The bridge has upright 12 from grooved blocks 13 which clamp to the opposite sides of the table in the manner described. A cross-bar 14 spans the uprights 12, and may be adjusted for height by clamping devices 15. It may not always be necessary to have this cross bar, and the uprights may be used independently, with or without further support devices clamped to them. Another fitting (not shown) is useful when an inflatable mattress or cushioning is used on the top 1. This can become dislodged, particularly when the animal is being manoeuvred on to it, but a few anchorages around the top to which the mattress or cushions can be tied or which can provide lateral barriers can prevent this.

Figure 4:
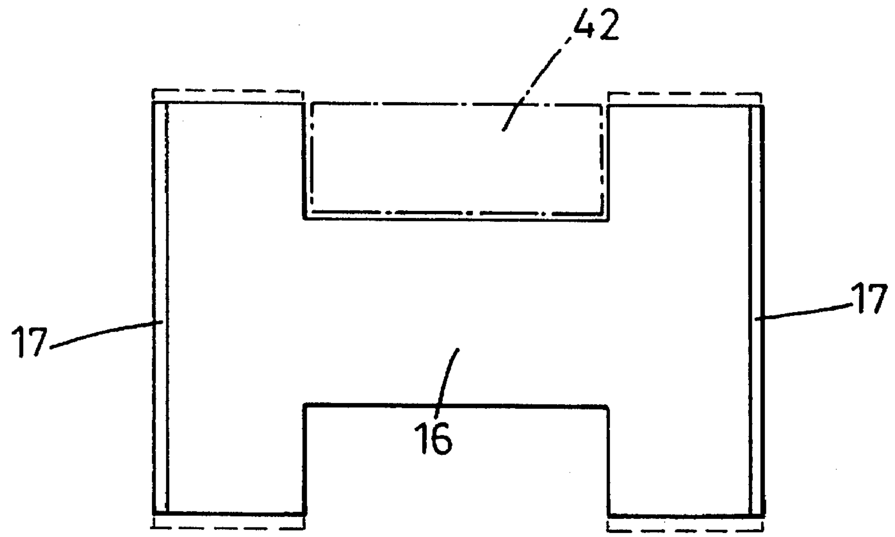
FIG. 4, is a plan view of an alternative table top.

There are alternative configurations for the table top, one being illustrated in FIG. 4, where the top 16 is H-shaped and thus ready-made to support an animal's legs without extensions. However, the ends have tongues 17 corresponding to the tongues 4, to accept extensions 5 to lengthen the top. These may also extend around the corners, as indicated by broken lines, to enable further lateral extensions, or devices such as the uprights 12, to be fitted. To accommodate a large animal in lateral recumbency, it may be necessary to widen the central portion of the table, and therefore provision will also be made for selectively fitting either of the re-entrants with a platform as indicated by the chain dotted rectangle 42.

Figure 5:
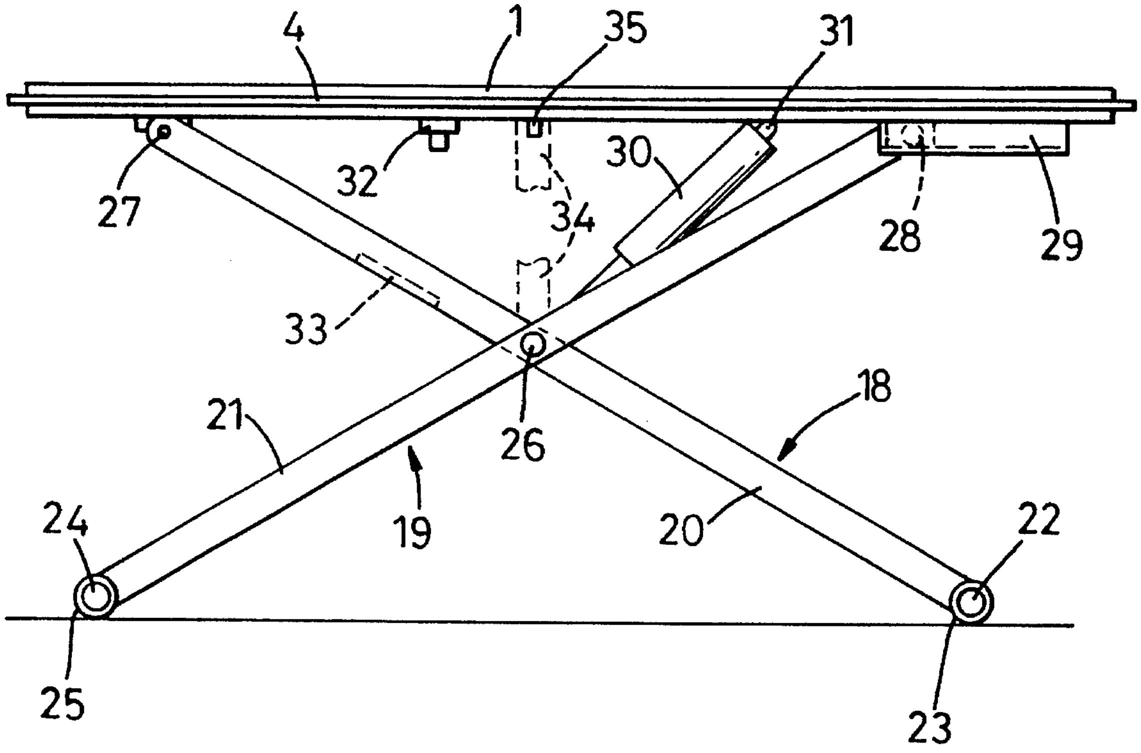
FIG. 5 is a side elevation of a surgical table in an intermediate position between being fully raised and lowered.
Figure 6:
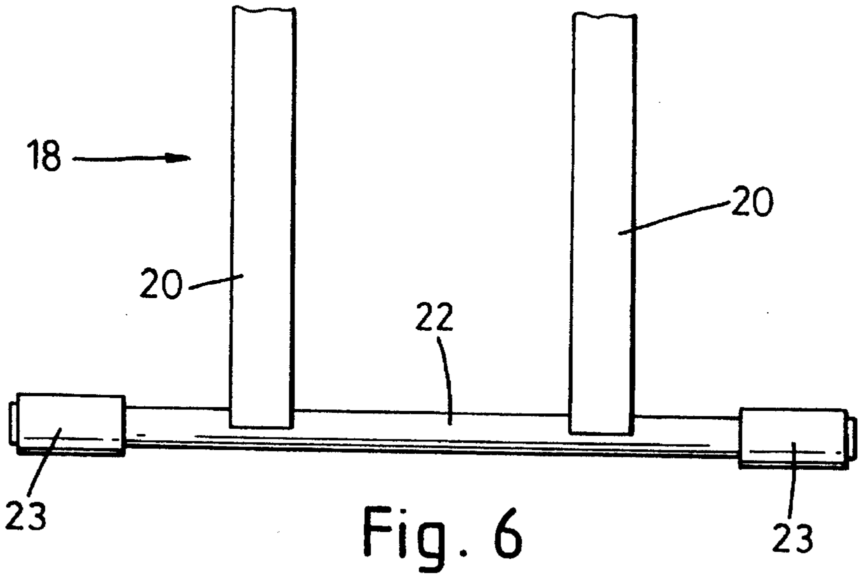
FIG. 6 is an end view of one of the legs of the table.

Referring now to FIGS. 5 and 6, the table top 1 is supported on two legs 18 and 19 which provide means for raising and lowering it. Both legs have two laterally spaced main longitudinal members, 20 in the case of the leg 18 and 21 for the leg 19. At the lower end the leg 18 has a transverse bar 22 spanning the members 20 and extending beyond them to carry rollers 23. There is a similar arrangement at the lower end of the leg 19 with a transverse bar 24 and rollers 25. The leg 18 lies between the members 21 of the leg 19, and the legs are mutually pivoted by coaxial self aligning bearings 26 coupling respective pairs of members 20 and 21 just above their mid-points. The lateral span of the pairs of rollers 23 and 25 is no more than the width of the top 1 (in the case of FIG. 1) while in the FIG. 1 embodiment it can be greater, the bars 22 and 24 lying beneath the "verticals" of the H.

At its upper end, the leg 18 is hinged at 27 to the underside of the table top 1, near one end, while the upper end of the leg 19 has, on the outer side of each member 21, a slide 28 which engages in a track 29 fixed to the underside of the table top 1 near the opposite end. There could simply be a roller co-operating with the track, but slides have been found to be more satisfactory. The couplings at the hinge 27 and between the legs 15 and slides 28 also use self aligning bearings since these, with a slight flexibility in the legs 18 and 19, allow the table to be moved, raised and lowered on an uneven floor without rocking. It will be evident that the legs 18 and 19 are capable of a scissor action, with the slides 28 running in the tracks 29, and the rollers 23 and 25 running apart or towards each other over the floor. The positioning of the bearings 26 just above the mid-points allows the transverse bar 24 to close up to the underside of the table top 1 beyond the hinge 27 and likewise the transverse bar 22 to close up beyond the tracks 29. Thus when the table is fully lowered the legs fold down virtually into the same plane. In the FIG. 1 arrangement, there is a stop (not shown) to prevent the legs closing together completely, to guard against a foot being trapped between a roller 23 or 25 and the underside of the top 1. But with the H-shaped top 16, the rollers are less accessible and the legs can fold flat against the floor. This makes for a very shallow platform on which to manoeuvre a large animal.

There are power means for raising and lowering the table. There is a main hydraulic actuator 30, one end of which bears on the leg 18 between the bearings 26 and the other end of which is connected to a point 31 on the framing on the underside of the table top 1. This point 31 is between the tracks 29 and the vertical plane through the axis of the bearings 26. When the table is fully lowered, the actuator 30 lies between the members 20 of the leg 18. Although the appearance in FIG. 5 is of a single ram, in practice it is favoured to have two side-by-side. In combination, they provide sufficient power, and yet they are sufficiently slim to fit in between the members 20 and to pack down snugly with the fully folded legs.

In that aligned position of the actuator 30, it is not capable of initiating the lift. To achieve this, there is provided a starter actuator 32 fitted to the underside of the table top 1, on the other side of the vertical plane through the pivot shaft 26 and arranged to bear vertically on a pad 33 spanning the members 20 of the leg 18. This actuator 32 is very squat, but it only has to produce a travel of a few centimeters, to start the lift, until the actuator 30 is at an angle at which it can take effect. At that point, the projecting thrust member of the actuator 32 is held by hydraulic pressure against an internal stop. The actuator 32 also functions to control the final stage of lowering the table, taking over from the almost exhausted actuator 30. The hydraulic connections are not shown for simplicity, but it will be appreciated that a single source can feed both actuators 30 and 32, and all that is needed is a single pump, which can be at a distance from the table, a simple control to activate it for raising the table, or allowing the weight of the table to force the hydraulic fluid gradually from the actuators, and a flexible hydraulic line from the pump to the table where it can be branced to the actuators. The main one will of course bleed first in the lowering phase.

When the table is fully raised, a mechanical stop ray be fitted. In this example, it is provided by a simple strut 34 which is set vertically with its tubular upper end located by a stud 35 projecting down from the underside of the table top 1 and with its lower end engaging a pivot in the region of the bearing 26. For insertion of this strut, the table is raised slightly above its working height, and then relaxed down again after the strut has been inserted. For lowering the table, the reverse procedure is adopted with the table being raised a little to allow extraction of the strut 34 first.

The arrangement described keeps the table top horizontal, and this suffices for most purposes. If a tilting table is required, it would be possible to make one or even both of the pairs of leg members 20 and 21 hydraulically extendible. This would generate a longitudinal tilt. A lateral tilt is hardly necessary, but can conveniently be achieved by selective inflation and deflation of the cushioning used on the top.

Figure 7:
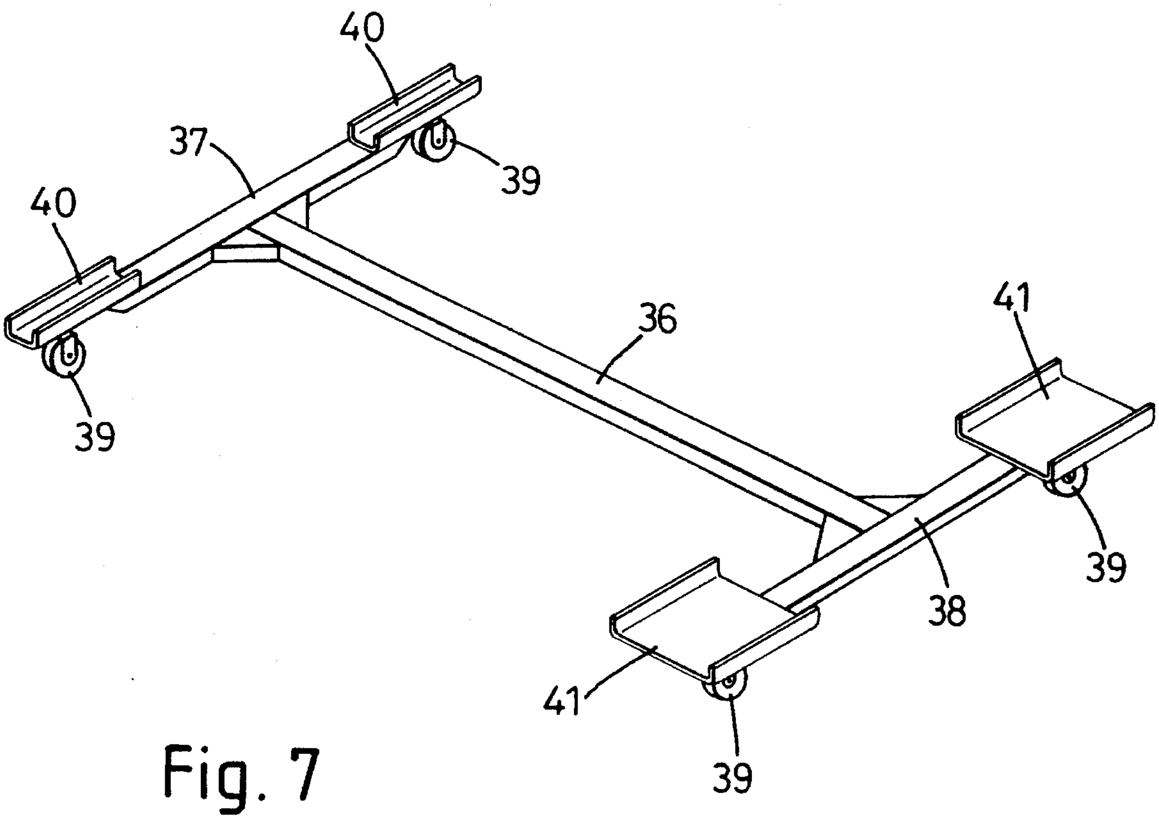
FIG. 7 is a perspective view of a trolley for carrying such tables.

The tables described have limited nobility in the longitudinal direction of the table top, but sometimes it is desirable to be able to manoeuvre the table in the transverse direction. At the cost of some compactness, the trolley shown in FIG. 7 may be employed for this, being designed to carry the table of the previous figures.

The trolley has a spine 36 with horizontal cross members 37 and 38 symmetrically fixed at opposite ends. Beneath these members are fitted castors 39. The member 37 has two narrow aligned, upwardly open channels 40 secured to its upper side at opposite ends to receive the rollers 25, say. Similarly positioned on the member 33 there are sider channels 41 to receive the other rollers 23. The table is held firmly by the channels 40, but is free to be raised and lowered with the rollers 23 travelling across the channels 41 from one flange to the other.

The above concentrates on a table suitable for large animals. A small animal table can follow most of the principles described, but obviously the proportions of legs to table top must be different if the relatively smaller top is to be raised to a convenient height. It is envisaged that the mutual pivot between the legs could be well above their mid points, and instead of a actuator operating at a varying angle between the legs and the underside of the table top, it could be horizontally fixed to that underside and operate on a yoke interconnecting the slides 28. A short travel of the yoke would correspond to substantial movement of the lower ends of the legs. A starter actuator would still be required if the legs folded flat.

The hydraulic circuit can also be pressure monitored by incorporating a pressure gauge. It will be appreciated that at the start of the lift from the fully closed position the starter ram provides a relatively linear reading. At a predetermined height slightly above the closed position the pressure gauge may be read, and it may be calibrated in units of weight to give a direct reading. In other words the table may be used as a weighing machine. The lower the static friction in the ram and bearing the better for accuracy. It would be very difficult to use the other rams as their geometry changes on lifting.

While in many cases animals will be under general anaesthetic for surgery, there are situations where the animal may be under local anaesthetic, or none at all. This applies particularly to small animals which can be held still by a vet or an assistant. In that case the table serves for tasks such as examination, clipping and innoculation.

Figure 8:
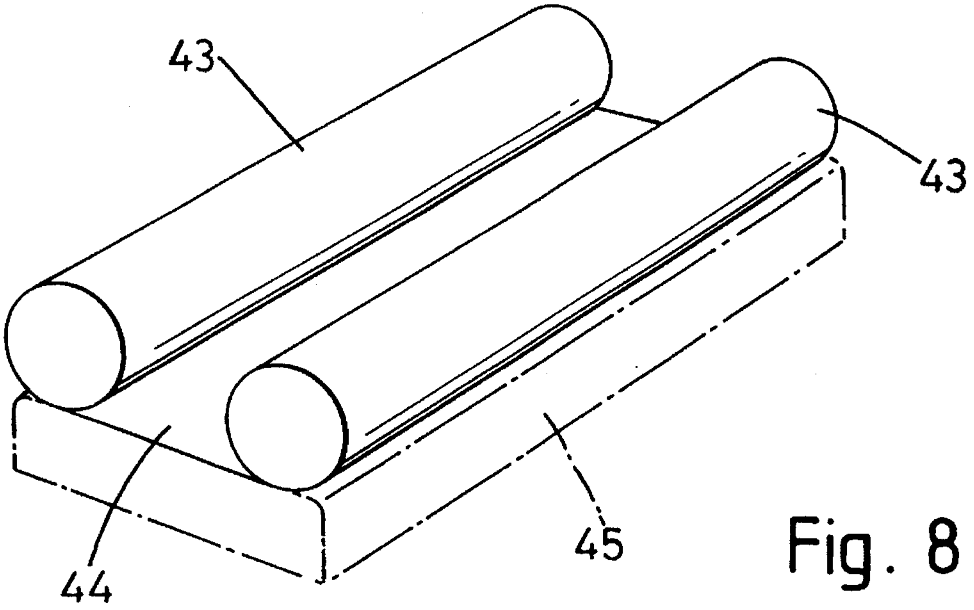
FIG. 8 is a perspective view of inflatable cushioning for the table top.

FIG. 8 shows an example of the cushioning for the table top parallel elongate air bags 43 are joined by a flexible web 44, and in the attitude shown, the air bags 43 when inflated create a valley in between to cradle an animal in dorsal recumbency. The web may be a flexible sheet, but it could itself be a much shallower air bag, to give some cushioning to the animal's spine. Also this arrangement may just be the upper layer of a selectively inflatable mattress, the lower layer being indicated in outline at 45.

If a flatter platform is required, but still with some resilience, the valley could be infilled with a separate air bag, and preferably the mattress would then be reversed to present the layer 45 uppermost. The bags 43 may then be deflated.

The extensions 5 can also be provided with air bag cushioning, capable of being contoured if desired, and the top 16 may have a mattress tailored if its H-shape.

The use of a non-conductive hydraulic hose such as rubber on kevlar as the supply hose eliminates any possibility of electricity passing to a table from the hydraulic pump unit remote from table.

Figure 9:
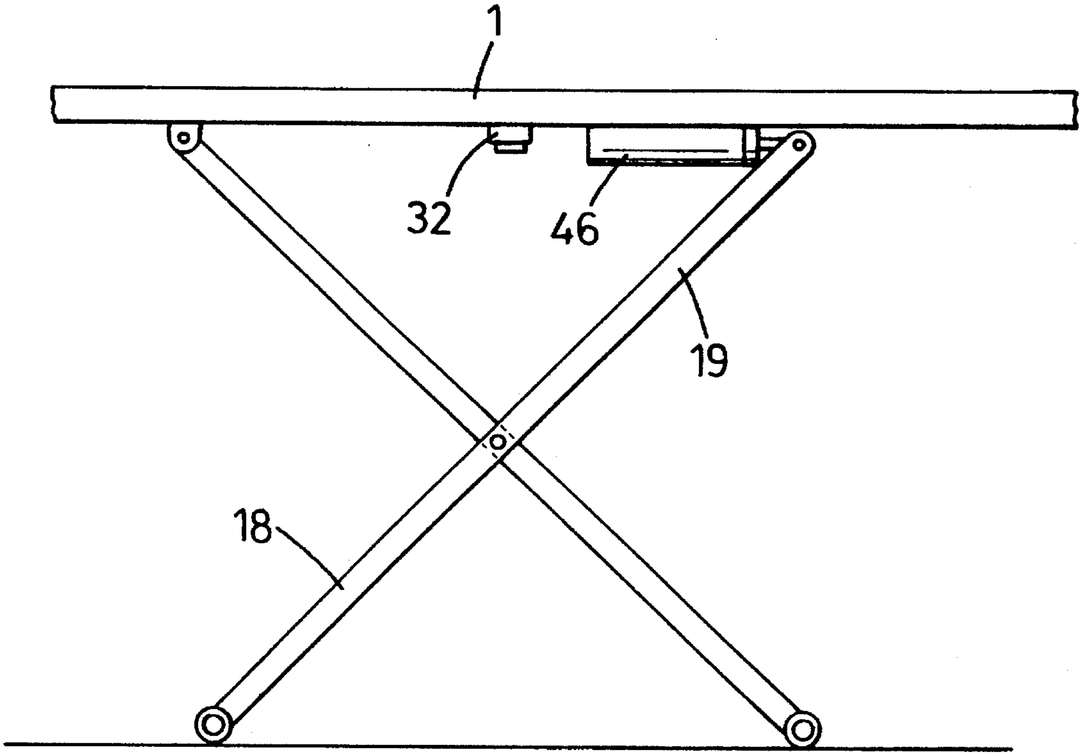
FIG. 9 is a diagrammatic side elevation of a surgical table when raised, with an alternative actuator position.

In FIG. 9 there is a different arrangement of the main actuator, now referenced 46. Its cylinder is fixed horizontally beneath the table top 1 and is aligned lengthwise of that top. Its rod couples to the top of the leg. As illustrated, the rod is retracted to raise the table, but it will be understood that the actuator could be beyond the legs and the projection of its rod, pushing on the leg 19, would raise the table. The starter actuator 32 is still provided.

I claim:

1. A surgical table with a top and extensions for the top adapted to be fitted to at least some edges thereof, each such edge and extension having mutual tongue and groove engagement means enabling infinitely variable positioning of the extensions and thus a selective contour of the table, wherein the tongue projects horizontally and laterally from the table top, and is continuous around each corner between the tongued edges, the extensions each being provided with a matching groove to enable fitting to and removal from the table by horizontal movement normal to the edge whose tongue is to be engaged, and each extension being slidable along that edge to project substantially beyond a corner of the table while being supported only by part of its groove.

2. A surgical table as claimed in claim 1, further comprising an inflatable mattress or cushioning to overlie the top and adapted to provide adjustable cradling of an animal.

3. A surgical table as claimed in claim 1, wherein a screw device operable from below the table top and threaded through a lower limb of a member defining the groove is provided to clamp the extension to the top.

4. A surgical table as claimed in claim 1, wherein a fitted extension is flush with the table top.

5. A surgical table as claimed in claim 1, and further comprising restraint or support appliances adapted to be fitted to said edges of the top in the same manner as said extensions.

6. A surgical table as claimed in claim 5, wherein a support appliance is an upright column.

7. A surgical table as claimed in claim 6, wherein two such columns fittable to opposite sides of the table, are bridged by a support element secured to them.

8. A surgical table as claimed in claim 5, wherein a restraint appliance provides an anchorage point for a mattress or cushioning overlaying the top.

9. A surgical table having a top and two mutually pivoted legs capable of varying between a lowered, flattened position and a raised X-form, the upper end of a first leg being hinged to the underside of the top, and the upper end of a second leg having a sliding or rolling engagement with said underside towards and away from the hinge of said one leg, and actuator means arranged to act between said legs and the table top to cause the legs to convert between the flattened position and the X-form, characterized in that the actuator means comprises a main actuator and a starter actuator, the starter actuator being substantially vertical to initiate and sustain the lift over a short travel from the flattened position, the main actuator being effective over the remainder of the lift.

10. A surgical table as claimed in claim 9, further comprising an inflatable mattress or cushioning to overlie the top and adapted to provide adjustable cradling of an animal.

11. A surgical table as claimed in claim 9, wherein the actuators are hydraulic.

12. A surgical table as claimed in claim 11, wherein the main actuator comprises two rams side by side and acting in parallel.

13. A surgical table as claimed in claim 9, wherein the main actuator is arranged to act on the legs in the region of their mutual pivot, and in the lowered position nests within the upper part of the second leg.

14. A surgical table as claimed in claim 9, wherein the main actuator is secured to the underside of the table top and acts horizontally on the upper end of said second leg.

15. A surgical table as claimed in claim 9, wherein a substantial part of one leg nests within the other leg in the flattened position.

16. A surgical table having a top and two mutually pivoted legs capable of varying between a lowered, flattened position and a raised X-form, the upper end of a first leg being hinged to the underside of the top, and the upper end of a second leg having a sliding or rolling engagement with said underside towards and away from the hinge of said one leg, and actuator means arranged to act between said legs and the table top to cause the legs to convert between the flattened position and the X-form, wherein the lower ends of the legs have lateral extensions, and at least one leg has roller means on such an extension to roll over a floor when the table is raised and lowered.

17. A surgical table as claimed in claim 16, further comprising an inflatable mattress or cushioning to overlie the top and adapted to provide adjustable cradling of an animal.

18. A surgical table having a top and two mutually pivoted legs capable of varying between a lowered, flattened position and a raised X-form, the upper end of a first leg being hinged to the underside of the top, and the upper end of a second leg having a sliding or rolling engagement with said underside towards and away from the hinge of said one leg, and actuator means arranged to act between said legs and the table top to cause the legs to convert between the flattened position and the X-form, and further comprising a low trolley with means for locating the lower end of one of the legs and for allowing limited travel of the lower end of the other of the legs, corresponding to the movement between the lowered, flattened position and the raised X-form.

* * * * *